United States Patent
Martel et al.

(10) Patent No.: US 8,942,486 B1
(45) Date of Patent: Jan. 27, 2015

(54) APPARATUS AND METHOD FOR IDENTIFYING OBJECTS AND ACTIVITIES BASED UPON AT LEAST ONE OF SHAPE, POSITION OR MOVEMENT

(75) Inventors: Thomas Martel, Manlius, NY (US); John T. Freyhof, Wayne, PA (US)

(73) Assignee: VY Corporation, Wayne, PA (US)

( * ) Notice: Subject to any disclaimer, the term of this patent is extended or adjusted under 35 U.S.C. 154(b) by 0 days.

(21) Appl. No.: 13/550,829

(22) Filed: Jul. 17, 2012

Related U.S. Application Data

(60) Provisional application No. 61/508,651, filed on Jul. 17, 2011.

(51) Int. Cl.
*G06K 9/64* (2006.01)
*G06K 9/62* (2006.01)

(52) U.S. Cl.
CPC .................................. *G06K 9/6277* (2013.01)
USPC ........................................ 382/217; 382/203

(58) Field of Classification Search
USPC ................. 382/162, 165, 141, 145, 217, 203; 345/156; 358/401, 486; 348/335, 360, 348/E5.028; 359/680, 681, 682, 683, 831; 715/200
See application file for complete search history.

(56) References Cited

U.S. PATENT DOCUMENTS 7,301,576 B2 * 11/2007 Mihara ......................... 348/335
7,684,610 B2 * 3/2010 Wong et al. .................. 382/141

* cited by examiner

*Primary Examiner* — Anh Do
(74) *Attorney, Agent, or Firm* — Neal Blibo, LLC

(57) ABSTRACT

Elements of an electronic image are organized into groups to obtain descriptive data associated with the electronic image. A wide field view of the electronic image is obtained from a first component and a higher resolution image of a selected portion of the wide field view of the electronic image is obtained from a second component to resolve ambiguity associated the selected portion of the wide field view of the electronic image. At least one primitive is formed using pixels of the electronic image, where the primitive is a curve primitive or a region primitive. The at least one primitive is analyzed using at least one level in a ladder of abstraction to organize elements of the electronic image into groups from which descriptive data can be obtained about at least one of objects or activities associated with the electronic image.

21 Claims, 5 Drawing Sheets

APPARATUS AND METHOD FOR IDENTIFYING OBJECTS AND ACTIVITIES BASED UPON AT LEAST ONE OF SHAPE, POSITION OR MOVEMENT

RELATED APPLICATIONS

This application claims benefit under 35 U.S.C. §119(e) from U.S. Provisional Patent Application Ser. No. 61/508,651 entitled "An Apparatus and Method for Identifying Objects and Activities Based Upon At Least One of Shape, Position or Movement", filed Jul. 17, 2011, the entire content of which is incorporated herein by reference

FIELD OF THE DISCLOSURE

The present invention relates to a method for identifying objects and activities within electronically acquired imagery, and more specifically, to organizing constituent elements of an image into meaningful groups from which descriptive data can be obtained about objects and/or activities.

BACKGROUND

Images, for example pictures or videos, may be obtained from a camera, the Internet or another source and stored as electronic data. In order for a user to identify shapes as they appear in still or moving images, the pixels associated with the electronically acquired data must be analyzed and the shapes identified. Constituent elements of an image, such as pixels, or groups of pixels, may be organized into meaningful groups, wherein each pixel group may include one or more groups of pixels. These elements are typically identified by known analytical processes. In particular, these elements may be organized and grouped to identify curved regions and boundaries. U.S. Pat. No. 7,734,112, which is incorporated by reference herein, describes this type of organization.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
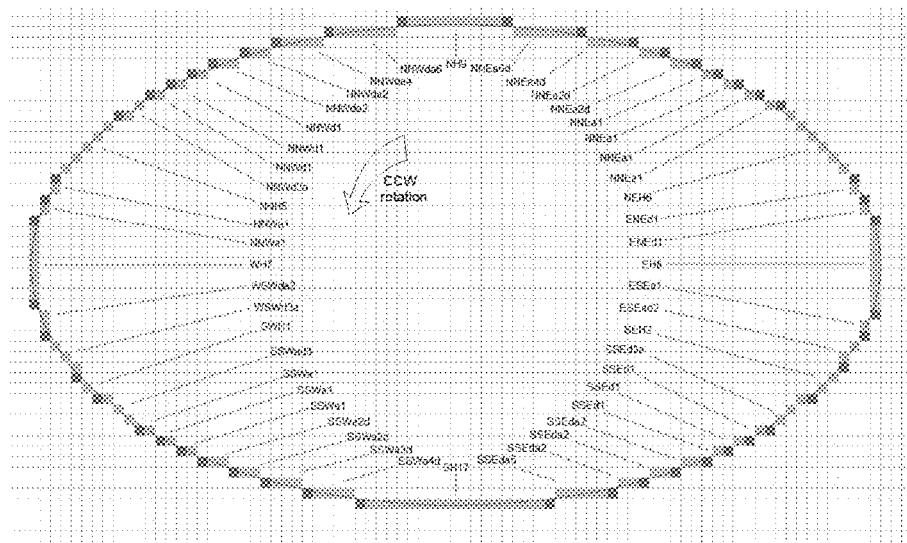
FIG. 1 illustrates a perimeter spanning distance representation model, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Some embodiments are directed to methods and apparatuses for organizing elements of an electronic image into groups to obtain descriptive data associated with the electronic image. A wide field view of the electronic image is obtained from a first component and a higher resolution image of a selected portion of the wide field view of the electronic image is obtained from a second component to resolve ambiguity associated the selected portion of the wide field view of the electronic image. At least one primitive is formed using pixels of the electronic image, where the primitive is a curve primitive or a region primitive. The at least one primitive is analyzed using at least one level in a ladder of abstraction to organize elements of the electronic image into groups from which descriptive data can be obtained about at least one of objects or activities associated with the electronic image.

An embodiment of the present invention is directed to a method that, although applied to the subject of curves as described in U.S. Pat. No. 7,734,112, is not dependent on or exclusively related to the art taught in U.S. Pat. No. 7,734,112. Indeed, the method described herein is applicable to a wide range of constituent element groupings. For example, the discovery of movement and the use of information about the direction, path, and velocity of movement, and of the association of a plurality of constituent element groupings having movement coordinated in some way by a central controlling entity, could be used as a source of information for discovering the meaningful groups from which descriptive data can be obtained about objects and/or activities. Embodiments may be directed to characterizing and searching a time series of images, such as video footage, using decision trees for the purpose of identifying objects and activities based upon at least one of shape, position or movement. Embodiments of the invention may also be applied to images including video schematics which include a collection of abstract attributes that are related spatially and temporally.

According to certain embodiments, electronic representations of an image obtained from a source, such as a camera or the Internet, may be stored as pixels. A gradient may be a group of neighboring pixels arranged in a line or pixel sets from other geometrical shapes, such as open or closed curves or polygons. A set of pixels constituting a gradient can be thought of as a single one-dimensional entity, whether that one-dimensional gradient set is arranged as a straight line segment, a curve, or as another arrangement. Such one-dimensional gradient set of neighboring pixels may be referred to as a "gradient run". In order to address images having objects including two-dimensional arrays of pixels, two-dimensional gradient representations of information-bearing regions of the electronically-acquired imagery may be used. According to some embodiments, such two-dimensional gradient representations may include a plurality of gradient runs that may be referred to as grenze sets. Therefore, a grenze set may include a plurality of adjacent gradient runs. A second order of grouping may be created in which the gradient runs are themselves grouped into larger collections. A criterion by which the first-order gradient pixel groups may be assembled into second-order gradient pixel groups may be that of proximity. The second order gradient pixel groups may also be referred to as grenze sets.

In an embodiment, images may be analyzed in different levels according to a "ladder of abstraction". The primary level in the ladder involves analysis of pixels from an image. The next levels in the ladder involve analysis of grenze sets, curve primitives and/or region (area) primitives. Next in the ladder is a mezzanine level, a level between analysis of generic curve primitives (for example, cubic splines, curves), region primitives (for example, 3-dimensional surfaces, convex or concave surfaces) and the analysis of frank object models. A frank object model is a model of an object having utility value to human beings. Examples of frank object models in an image could include, but are not limited to, a face, the human form, cars, vehicles, aircraft, weapons, railroads, buildings, transportation infrastructure, and natural artifacts (for example, plants, animals, fruit). In this discussion, cubic splines curves are used to describe generic curve primitives. It should be noted that other shapes may be used as generic curve primitives. It should also be noted that although this discussion describes analysis of generic curve primitives, this analysis can also be applied to region primitives.

At the mezzanine level, shapes are sought without regard to an object identity as it relates to human utility, and without regard to the pixel arrangement of the focal plane array. Shape classes at the mezzanine level include ellipses, circles, straight lines, arcs (pieces of ellipses) and angle primitives. Shape characteristics, concave-side and convex-side color and shading characteristics, and possibly statistics (characteristic of texture) are used to guide a process of association. This overcomes a "focal plane morphology" issue—a set of constraints imposed by the morphology of the pixels in the focal plane array. This includes the rows and columns of pixels, and their rectilinear arrangement. This morphology necessarily restricts the range over which a grenze set can be continued around a compact object. This, in turn, prevents the discovery of cubic splines that continue around the whole perimeter of a compact object. In the process of association, Bézier curves may be connected. Bézier curves are cubic splines that are connected into larger splines and that "continue" around whole compact objects without regard to pixel geometry.

During analysis at the mezzanine level, at some point, it may be appropriate to represent a curve as a section of an ellipse or circle. Before reaching that point, a curve around a compact object can be represented as a string arising from a "winning" path through a tree. At this point, the quality factor of a grenze set may be used to control or suggest the association of continued splines. In addition, control point coalescence, concave/convex statistics, endpoint alignment (also referred to as flashlight) wherein an angle of acceptance could be based on one of the radius of curvature, distance of closest approach of directorix, or quality factor of the underlying grenze set may also be used to control or suggest the association of continued splines. "Ignored" points, for example "don't care" points, cubic spline(s) fit forced to accommodate a continued grenze set, or "don't care" points not included in fit figure of merit calculation may also be considered to control or suggest the association of continued splines. The association of continued splines may further be based on a sense and contrast state of an object against a background.

In an embodiment, the following abbreviations correspond to the following meanings: "CW" means clockwise direction with respect to the concave and convex sides of a curve; "CCW" means counterclockwise direction with respect to the concave and convex sides of a curve; and gradient senses, such as "LDFW" means light-to-dark forward (meaning left to right on the image), "LDTS" means light-to-dark, to south (meaning top to bottom on the image), "DLRV" means dark-to-light, reverse (meaning right to left on the image), and "DLTN" means dark-to-light, to north (meaning bottom to top on the image). Using the above abbreviations, transitions rules may be applied to the object. For example, transition rules for CW, dark object, light background may be LDFW→LDTS, LDTS→DLRV, DLRV→DLTN, DLTN→LDFW. The transition rules for CW, light object, dark background may be DLFW→DLTS, DLTS→LDRV, LDRV→LDTN, LDTN→DLFW. The transition rules for CCW, dark object, light background may be LDFW→DLTN, DLTN→DLRV, DLRV→LDTS, LDTS→LDFW. The transition rules for CCW, light object, dark background may be DLFW→LDTN, LDTN→LDRV, LDRV→DLTS, DLTS→DLFW. Similar transitions rules exist for the opposite directions as will be plain to one learned in the art.

In some embodiments, object-associated rules provide an avenue for symbolically expressing the physical configuration, or morphology, of real objects in a way that can be used to prune a search tree. As noted above, images may be analyzed at different levels in the "ladder of abstraction". Object-associated rules are the real implementation of video schematics, or at least, the lowest level of a video schematic representation and may be used to identify frank object models. These rules may represent sets of expected edges associated with different distinct view of classes of physical objects such as cars, vehicles, people, etc. There is a finite number of view classes associated with different categories of objects. Sometimes, as with road vehicles such as cars, the set of view classes is more strongly constrained by, for example, the force of gravity. Thus the set of view classes for cars, sport utility vehicles, minivans, and trucks can be seen to be a ring of distinct classes that span the 360° path around the object. Of course, more z-axis tolerance can be achieved by defining a couple of distinct view-class rings corresponding to different heights of the point-of-view. Basically, these would be characterized as "rooftop visible" and "rooftop not visible".

Video schematics may be represented as Extensible Markup Language (XML) or other symbols, may include degrees of freedom and may also include "attachment points." For example, an attachment point for a car may be its door. The car door can be opened, and when opened, substantially changes the shape of the car, but the car is still a car. Video schematics may also be a perimeter spanning distance representation model, as shown in FIG. 1. The model shown in FIG. 1 is a scale-and-angle-independent model for representing the perimeter (envelope) of objects as a series of spanning transitions on the unit circle. It is an agreeably "crude" method. In this model, smaller spanning distances correspond to larger radius of curvature figures, and larger spanning distances correspond to smaller ROC figures and representative ellipse(s) show spanning distance progression on the circle.

Embodiments of the invention can therefore be applied to global and local appearance variable optimization by feature extractions, such as f-stop, local threshold and focus. Embodiments can also be used for local variations in resolution or fungible resolution in a camera's (or other image acquiring means) field of view. Consider that a camera can see 'X' and that some subset of 'X' is blurred, some embodiments may therefore be used to 'zero in' on and analyze the blurry part(s), and make improvements to the grand field of view. Deployment of resolution is an optimization problem, wherein moving zones of higher resolution can be used to track subjects, enhance feature extraction, and guide the matching of resolution assets to the analytical problem presented by the features of the image as they relate to a larger context guided by video schematic rules [these rules tend to embody characteristics that have utility to human beings].

Embodiments of the invention can be implemented in a multi-point camera, that is, a camera architecture that works in concert with an algorithm implemented in an embodiment to achieve high reliability for object tagging and tracking. The basic idea is to combine a wide-field binocular camera (WFB) and a steerable variable resolution camera (SVR). The WFB camera may include two wide-field cameras having overlapping fields of view. These cameras may be separately mechanically steerable both in yaw (side to side) and roll (rotation about the optical axis). Pitch would be implemented collectively for the entire WFB camera. The SVR camera is controlled by instructions from an algorithm implemented in an embodiment. The SVR camera can be mechanically steered through yaw and pitch, and perhaps roll, by electric motors or other means. The SVR camera lens is a variable resolution (zoom) lens, the magnification factor of which can be controlled by means of an electric motor or other means. It should be noted that the functions of the WFB and SVR cameras may be executed by one or more components of the multi-point camera.

Both the WFB and SVR cameras may incorporate a Spatial (Automated Gain Control) AGC technology to improve signal-to-noise ratio. It should be noted that embodiments may also be used with a WVB/SVR camera that does not incorporate Spatial AGC technology. The entire multi-point camera package can be mounted on a mobile platform (e.g. a robot). An algorithm implemented in an embodiment provides several characteristics that control and interpret data from a multi-point camera. Embodiments may require a multi-point camera architecture, or something similar, to achieve the full performance potential in the non-engineered or semi-engineered environment.

Information about the placement of objects, including their distance from the multi point camera, as well as information about the movement of objects in the large field of view observed by the WFB, is interpreted by algorithms implemented in an embodiment. Depending upon the needs and requirements of the algorithms for more information to resolve visual ambiguity or other sources of uncertainty, the SVR camera is commanded by the algorithms to obtain a higher resolution image of a selected portion of the scene. In this way, the scarce resource of "pixels" is matched to the non-uniform distribution of meaningful (or salient) detail in the field of view of the multi-point camera.

Figure 2:
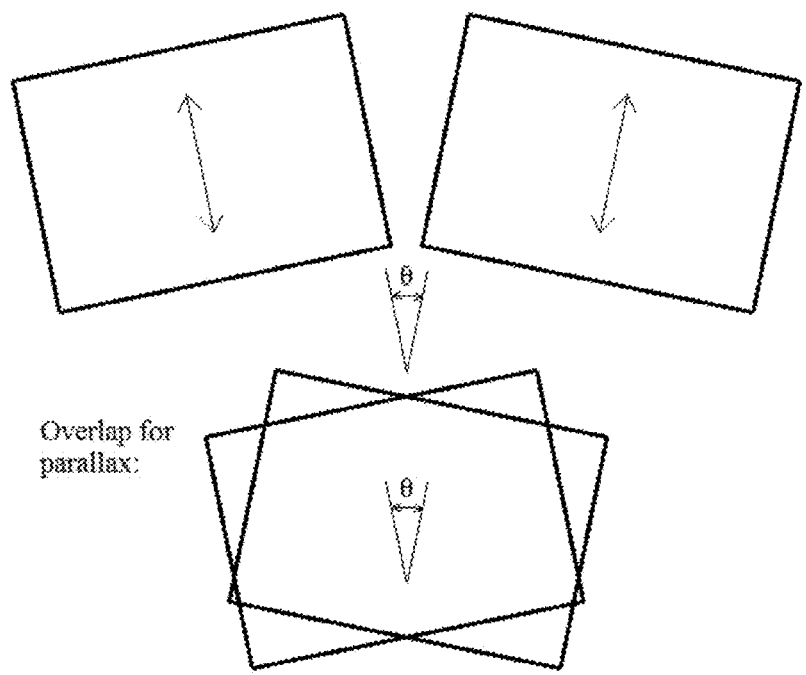
FIG. 2 illustrates a two-camera arrangement, according to some embodiments.

In particular, FIG. 2 illustrates a two-camera arrangement used in accordance with some embodiments. Multiple cameras are arranged so as to aim each camera at a single point in space with a deliberate tilt or angular displacement in such a way as to place this point within each camera's respective field of view. Pixel columns of each pair of cameras are offset by a small angle θ, which is variable under software control (via electromechanical or electro optical actuation). This is the equivalent of the natural angle of offset (may be referred to as "cyclovergence") and can be "adjusted out." The optical axes of pairs of cameras can be adjusted to converge at a single point. In a single camera version, the camera can be rotated about its optical axis.

Embodiments can also be applied to cubic spline representation of arbitrary analog waveform. This is the application of the C-S transform as a waveform compression and representation means that is based on floating-point numbers, and is arbitrarily re-sampleable to any resolution, wherein waveform may be converted to a floating-point form, characterized by floating point ordered pairs that encode the position of control points.

The camera or sensor platform state characterization includes zoom rate detection, pan-tilt characterization, and sensor motion characterization, analogous to yaw, pitch and roll in an aircraft. Data provided by this state characterization can be used to make the sensor a "dead reckoning" sensor; in situations involving a static sensor, fixed pan-tilt-zoom sensor, or a sensor mounted on a moving platform such as a ground vehicle or aircraft. Zoom rate detection may include, for example, accurate detection of "zoom-in" and "zoom-out" conditions, measurement of zoom rate. Smaller (dead zone) i.e. more accurate, more confident detection of the "no-zoom" state is achievable by sub-pixel resolution obtained as a result of the mathematical curve-fitting.

Embodiments may also be directed to advanced selection of grenze sets, curve primitives, and cubic splines. Further embodiments may be directed toward simple objects such as ellipses, spheres, and ellipsoids, as well as complex objects such as people, vehicles, weapons, and other real-world objects. Typical uses could involve, but are not necessarily limited to, pointing devices such as a mouse, trackball, or touch screen. By automatically associating a multiplicity of pixels on the basis of their forming the image of useful real-world objects, embodiments provide an avenue of addressing image content based on its representation of items of utility and interest to humans, instead of on the basis of their representation by the visualization means. This behavior could be manifested, but isn't necessarily limited to, a mouse pointer changing shape, size, or color based on objects, images, or pre-defined features of the image as directed by a user.

Embodiments may also be directed to appearance variable adjustment to enhance object detection, user understanding and image context. Control of appearance variables may be obtained by a combination of the setting of an iris diaphragm (controlling the total amount of light admitted to the image-forming means, as in a camera), by means of threshold sensitivity and gain adjustments to one or more pixels within a pixel region associated with a given object, or by a combination of these means. A further application of this concept would assist in the discovery of "shape from shading," aiding in the discovery, identification, tagging and tracking of three-dimensional objects from their three-dimensional structure in conjunction with lighting characteristics of the environment of the scene.

Other embodiments may be directed towards the steering, guiding, or directing of motorized devices including robots, surface, undersea, and airborne transportation vehicles, prosthetic devices such as wheelchairs, patient-assist robots, and other devices of similar utility. Specific activities could involve, but are not necessarily limited to, tagging, tracking, identification, recognition, manipulation, transport, capture, grasping, shaking, stirring, painting, cleaning, heating, disinfecting, etc., of simple or complex physical objects as well as associated activities.

Other embodiments may be directed toward the finding of two functions, $f_1$ and $f_2$ on a common parameter T, such that for each value of T between 0.0 and 1.0, the functions $f_1(T)$ and $f_2(T)$ generate values of $t_1$ and $t_2$, where parameters $t_1$ and $t_2$ represent the Bézier parameters t for each of two Bézier curves $B_1$ and $B_2$ arising from two distinct images $I_1$ and $I_2$. The two images may be obtained from two cameras $C_1$ and $C_2$ at two different locations in space, where $C_1$ and $C_2$ are oriented so as to aim their optical axes in a manner that causes their respective field of views to contain a region—in physical space—of mutual overlap. Therefore, $f_1(T)=t_1$ and $f_2(T)=t_2$.

Figure 3:
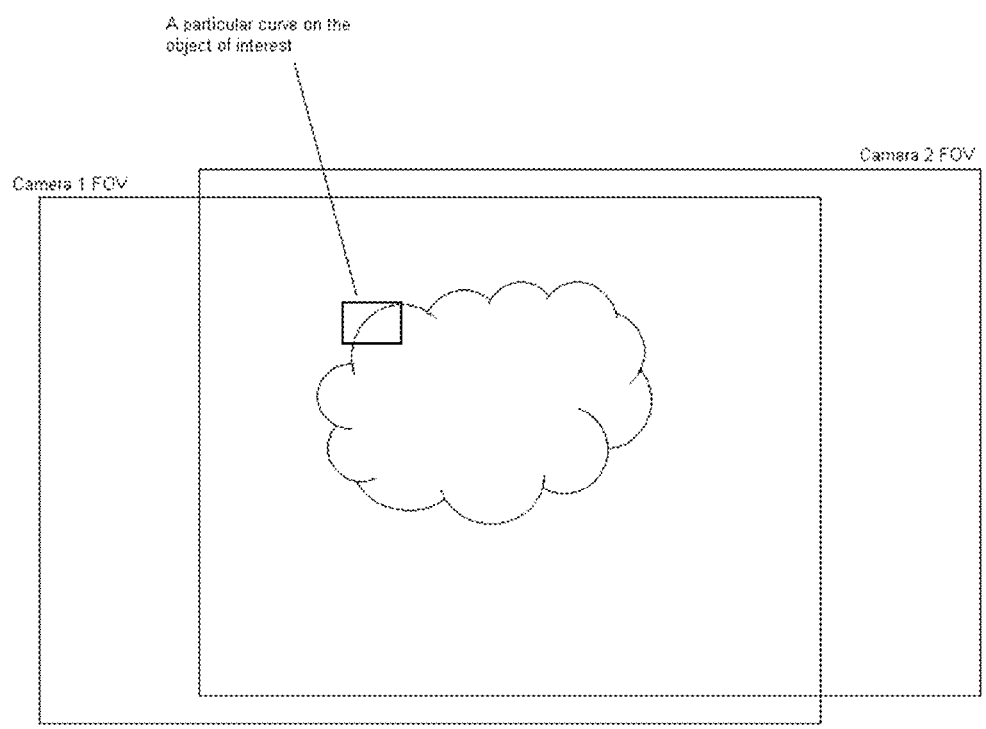
FIG. 3 illustrates a representation of a generalized three-dimensional object of interest as it appears in respective fields-of-view of two cameras, according to some embodiments.

FIG. 3 illustrates a representation of a generalized three-dimensional object of interest as it appears in the respective fields of view of two cameras, which are referred to as Camera 1 and Camera 2. In this representation the effect of parallax which arises from the angular displacement between Camera 1 and Camera 2 is not shown, but it is understood to exist in any case of an object of interest having significant depth (or "Z-axis") extent. It is further understood that although the labeling scheme of FIG. 3 implies the use of two different, distinct cameras, embodiments could just as well be used for two images each of which is acquired by the same identical camera at two different points in time, if that camera is moving through space. It should also be apparent to those skilled in the art that this same technique could be applied to more than two images, acquired from a collection of more than two cameras, or from one or more separate cameras at multiple points in time.

Figure 4:
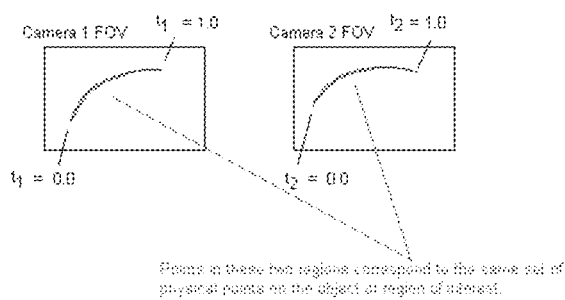
FIG. 4 illustrates given Bézier curves within each of two frames, according to some embodiments.

FIG. 4 illustrates that a given Bézier curve within each of the two frames has, in general, only a subset of points held in common with the same set of physical points belonging to the physical object. The Bézier curve shown in FIG. 4 arises in each case from the same physical edge or feature of the same physical object in the common field of view of the two cameras. A pair of mathematical functions $f_1$ and $f_2$ are provided on an independent variable T, having the property that for each value of T, the points $P_1$ and $P_2$ are defined as follows:

wherein, $P_1=f_1(T)$ and $P_2=f_2(T)$ correspond to the same physical point on the object/region of interest.

Figure 5:
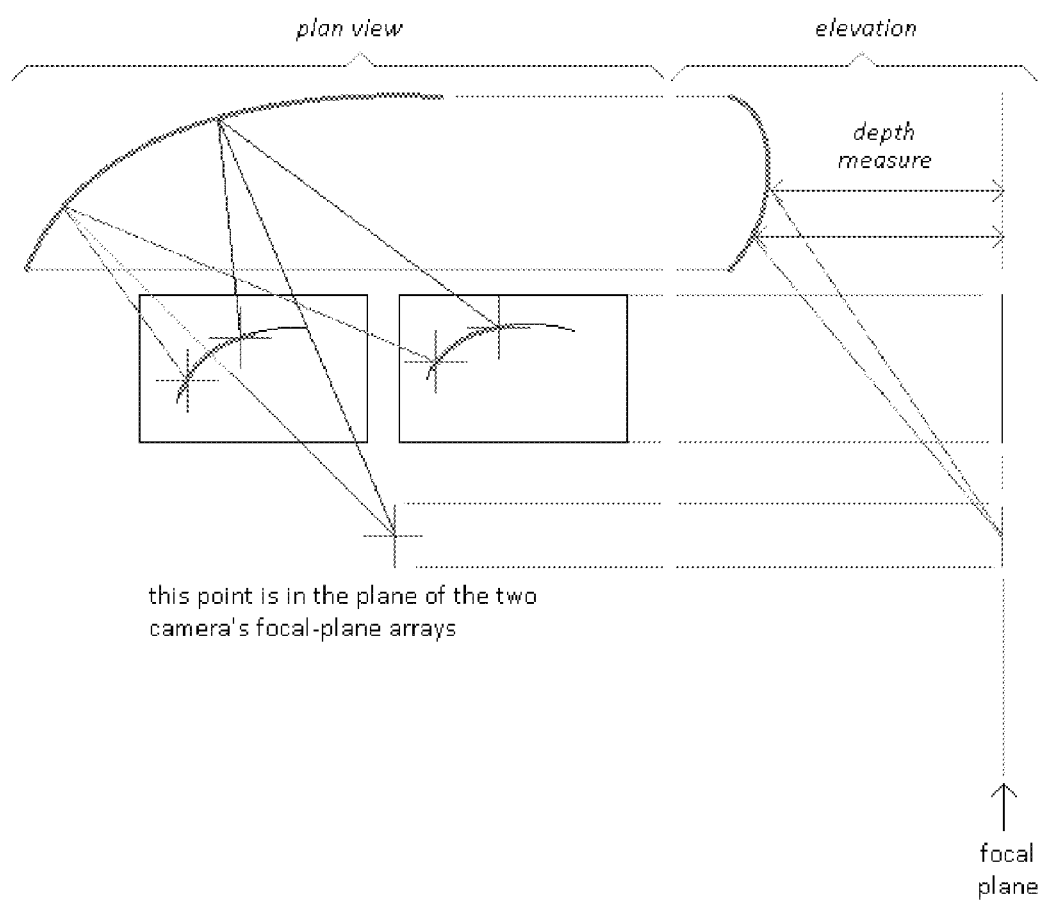
FIG. 5 further illustrates the Bézier curves, in accordance with some embodiments.
Figure 6:
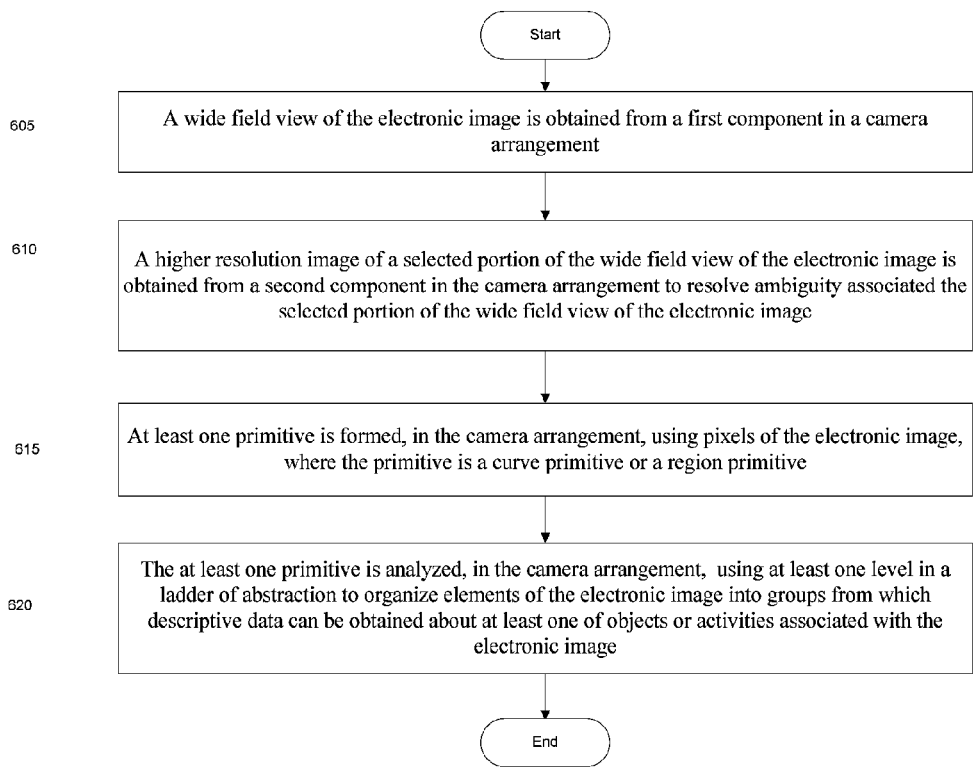
FIG. 6 illustrates a flow diagram of a method implemented in accordance with some embodiments.

Once $f_1$ and $f_2$ are known, and the extent and shape of the region of overlap of the two cameras' respective fields-of-view are known, one skilled in the art may calculate the "Z-axis" distance to each physical point from the two cameras by triangulation. In this case, the Z-axis refers to a direction that is perpendicular, or nearly perpendicular, to the image plane of two cameras. FIG. 5 further illustrates the Bézier curve, in accordance with some embodiments. FIG. 6 illustrates a flow diagram of a method implemented in accordance with some embodiments. At 605, a wide field view of the electronic image is obtained from a first component in a camera arrangement. At 610, a higher resolution image of a selected portion of the wide field view of the electronic image is obtained from a second component in the camera arrangement to resolve ambiguity associated the selected portion of the wide field view of the electronic image. At 615, at least one primitive is formed, in the camera arrangement, using pixels of the electronic image, where the primitive is a curve primitive or a region primitive. At 620, the at least one primitive is analyzed, in the camera arrangement, using at least one level in a ladder of abstraction to organize elements of the electronic image into groups from which descriptive data can be obtained about at least one of objects or activities associated with the electronic image.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for organizing elements of an electronic image into groups to obtain descriptive data associated with the electronic image, the method comprising:
   obtaining, via an image capture component, a wide field view of the electronic image from a first component;
   obtaining, via the image capture component, a higher resolution image of a selected portion of the wide field view of the electronic image from a second component to resolve ambiguity associated the selected portion of the wide field view of the electronic image;
   forming, via the image capture component, at least one primitive using pixels of the electronic image, wherein the at least one primitive is one of a curve primitive and a region primitive; and
   analyzing, via the image capture component, the at least one primitive using at least one level in a ladder of abstraction to organize elements of the electronic image into groups from which descriptive data can be obtained about at least one of objects and activities associated with the electronic image.

2. The method of claim 1, wherein each of the first component and the second component is aimed at a single point in space with an angular displacement such that the single point is within each of the first component and the second component field of view.

3. The method of claim 1, wherein pixel columns of each of the first component and the second component are offset by an angle.

4. The method of claim 1, wherein
   a first level in the ladder of abstraction involves analysis of pixels in the electronic image;
   a second level in the ladder of abstraction involves analysis of at least one of a grenze set and a curve primitive in the electronic image;
   a third level in the ladder of abstraction involves associating pixels in the electronic image with one of the grenze set and the curve primitive to create a shape without regards to utility of the created shape; and
   a fourth level in the ladder of abstraction involves analysis of a frank object model of the electronic image.

5. The method of claim 4, wherein, at the third level in the ladder of abstraction, shape characteristic, including at least one of color, shading and statistics are used to guide a process for associating pixels with one of the grenze set and the curve primitive.

6. The method of claim 4, wherein at the third level in the ladder of abstraction, at least one of a quality factor of one of the curve primitive and the grenze set, angular placement of one of the curve primitive and the grenze set, ignore-points associated with one of the curve primitive and the grenze set, and a contrast state of the electronic image against a background is used to guide a process for associating pixels with one of the grenze set and the curve primitive.

7. The method of claim 4, wherein a Bézier curve is created in the third level in the ladder of abstraction by connecting cubic splines into larger splines that continue around whole compact objects without regard to pixel geometry.

8. The method of claim 4, further comprising using object-associated rules in the fourth level to identify the frank object model of the electronic image, wherein the object-associated rules symbolically express physical configurations of an object represented by the electronic image and represent expected edges associated with distinct views of classes of physical objects.

9. The method of claim 1, wherein the electronic image is a cubic spline representation of an arbitrary analog waveform.

10. The method of claim 1, wherein the analyzing comprises analyzing the at least one curve primitive in the ladder of abstraction to at least one of detect appearance variable adjustment for enhanced object detection, assist in discovery of shape from shading, and assist in discovery, identification, tagging and tracking of three-dimensional objects.

11. The method of claim 1, wherein the analyzing comprises analyzing the at least one curve primitive in the ladder of abstraction to steer motorized devices.

12. The method of claim 1, wherein the analyzing comprises analyzing the at least one curve primitive in the ladder of abstraction to find two functions on a common parameter, such that each function generates a Bézier parameter for each of two Bézier curves arising from two distinct images.

13. An apparatus configured to organize elements of an electronic image into groups to obtain descriptive data associated with the electronic image, the apparatus comprises:
   a capturing unit configured to obtain a wide field view of the electronic image from a first component and to obtain a higher resolution image of a selected portion of the wide field view of the electronic image from a second component to resolve ambiguity associated the selected portion of the wide field view of the electronic image; and
   a processing unit configured to form at least one primitive using pixels of the electronic image, wherein the at least one primitive is one of a curve primitive and a region primitive, and to analyze the at least one primitive using at least one level in a ladder of abstraction to organize elements of the electronic image into groups from which descriptive data can be obtained about at least one of objects and activities associated with the electronic image.

14. The apparatus of claim 13, wherein each of the first component and the second component is aimed at a single point in space with an angular displacement such that the single point is within each of the first component and the second component field of view.

15. The apparatus of claim 13, wherein pixel columns of each of the first component and the second component are offset by an angle.

16. The apparatus of claim 13, wherein the processing unit is configured to analyze the at least one curve primitive using the ladder of abstraction, wherein
   a first level in the ladder of abstraction involves analysis of pixels in the electronic image;
   a second level in the ladder of abstraction involves analysis of at least one of a grenze set and a curve primitive in the electronic image;
   a third level in the ladder of abstraction involves associating pixels in the electronic image with the one of grenze set and the curve primitive to create a shape without regards to utility of the created shape; and a fourth level in the ladder of abstraction involves analysis of a frank object model of the electronic image.

17. The apparatus of claim 16, wherein the processing unit is configured to use, at the third level in the ladder of abstraction, shape characteristic, including at least one of color, shading and statistics to guide a process for associating pixels with the one of grenze set and the curve primitive.

18. The apparatus of claim 16, wherein the processing unit is configured to use, at the third level in the ladder of abstraction, at least one of a quality factor of one of the curve primitive and the grenze set, angular placement of one of the curve primitive and the grenze set, ignore-points associated with one of the curve primitive and the grenze set, and a contrast state of the electronic image against a background to guide a process for associating pixels with one of the grenze set and the curve primitive.

19. The apparatus of claim 18, wherein the processing unit is configured to create a Bézier curve is in the third level in the ladder of abstraction by connecting cubic splines into larger splines that continue around whole compact objects without regard to pixel geometry.

20. The apparatus of claim 16, wherein the processing unit is configured to use object-associated rules in the fourth level to identify the frank object model of the electronic image, wherein the object-associated rules symbolically express physical configurations of an object represented by the electronic image and represent expected edges associated with distinct views of classes of physical objects.

21. The apparatus of claim 13, wherein the processing unit is configured to:
analyze the at least one curve primitive in the ladder of abstraction to at least one of detect appearance variable adjustment for enhanced object detection, at least one of assist in discovery of shape from shading, and assist in discovery, identification, tagging and tracking of three-dimensional objects;
analyze the at least one curve primitive in the ladder of abstraction to steer motorized devices; or
analyze the at least one curve primitive in the ladder of abstraction to find two functions on a common parameter, such that each function generates a Bézier parameter for each of two Bezier curves arising from two distinct images.

* * * * *